United States Patent Office 3,210,384

Patented Oct. 5, 1965

3,210,384

PROCESS FOR THE PREPARATION OF 3,3',5,5'-TETRA-SUBSTITUTED DIPHENOQUINONE

Allan S. Hay, Schenectady, N.Y., assignor to General Electric Company, a corporation of New York No Drawing. Filed Nov. 21, 1962, Ser. No. 239,316
9 Claims. (Cl. 260—396)

This application is a continuation-in-part of my copending application, Serial No. 117,837, filed June 19, 1961, now abandoned, and assigned to the same assignee as the present invention.

This invention relates to a process for preparing tetrasubstituted diphenoquinones. More particularly, the invention relates to a process for preparing 3,3',5,5'-tetrasubstituted diphenoquinones by a self-condensation reaction in which oxygen is reacted with a 2,6-disubstituted phenol in a solution also containing dissolved therein an oxygen-carrying intermediate comprising a complex of a basic cupric salt and an organic nitrogen-containing compound selected from the class consisting of nitriles and tertiary amides. More particularly, this invention relates to the oxidation of disubstituted monohydric, monocyclic phenols in the presence of an oxygen-carrying intermediate comprising a complex of a basic cupric salt and an organic nitrogen containing compound selected from the group consisting of nitriles and tertiary amides which are either cyano or tertiary carbamoyl (N,N-dihydrocarbon-substituted carbamoyl) substituted hydrocarbons.

I use the term "monohydric, monocyclic phenol" in its true chemical sense to designate those compounds containing only one hydroxyl group directly attached to a six-membered aromatic group composed only of carbon atoms, viz., a monohydric phenol of the benzene series. The 2,6- disubstituted monohydric, monocyclic phenols may be represented by the general formula

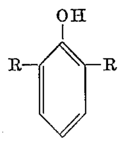

where each R is the same or different monovalent radical selected from the group consisting of alkyl, alkoxy, aryl and aryloxy radicals.

In the past, diphenoquinones have been prepared by oxidizing 2,6-disubstituted phenols with chemical oxidizing agents such as peroxides, chromic acid, nitric acid, potassium ferricyanide and the like. These processes suffer from the fact that they give relatively poor yields in the range of 50–70%, with the balance being oxidized to undesirable by-products which must be removed along with the residue of the oxidizing agent in recovering the desired diphenoquinones. Furthermore, stoichiometric amounts of relatively high cost oxidizing agents are required for each mole of disubstituted phenol oxidized, and relatively long times are required to carry out the oxidation step. For example, in an article entitled, "Reaction of Acylperoxides With Phenols," by Cheves, Walling and Russell B. Hodgdon, Jr., J. Am. Chem. Soc., 80, 228–33 (1958), 2,6-disubstituted phenols, such as 2,6-xylene, 2-6-dimethoxy phenol and 2,6-diisopropylphenol, are reacted with various peroxides such as benzoyl peroxide, acetyl peroxide, t-butylperbenzoate, etc., in a benzene solution. The reaction of 12.1 grams of benzoyl peroxide and 6.1 grams of 2,6-xylenol when reacted for 6 hours at the reflux temperature of the benzene yielded 3.8 grams (62.3% of theory) of 3,3',5,5'-tetramethyldiphenoquinone as a red solid. When carried out at room temperature, the reaction required 3 weeks to give a 52.4% yield.

Unexpectedly, I have now discovered a general, rapid, facile and inexpensive method of oxidizing 2,6-disubstituted monohydric, monocyclic phenols to produce the corresponding diphenoquinones, in relatively high yields with little, if any, formation of by-products, which comprises reacting oxygen or other oxygen-containing gas, e.g., air, etc., with a solution of such phenols dissolved in a suitable solvent inert to the oxidizing conditions, in the presence of a dissolved oxygen-carrying intermediate comprising a basic cupric salt complex of an organic nitrogen-containing compound selected from the group consisting of cyano-substituted hydrocarbons and N,N-di (monovalent hydrocarbon) carbamoyl substituted hydrocarbons. This reaction may be carried out readily at atmospheric pressure at temperatures from ambient up to the reflux temperature of the reaction mixture in a matter of minutes up to several hours. Subatmospheric or superatmospheric pressures and temperatures lower than ambient conditions or, by the use of pressure, temperatures higher than, will cause reflux at atmospheric pressure, may of course be used, but there is no incentive for the use of such conditions in preference to ambient up to reflux temperature conditions at atmospheric pressure, since the lower temperatures and pressure decrease the reaction rate and the higher cost of pressure equipment is not justified by the somewhat faster reaction rate.

The overall oxidation reaction to which my invention is directed is shown in the following schematic diagram:

EQUATION I

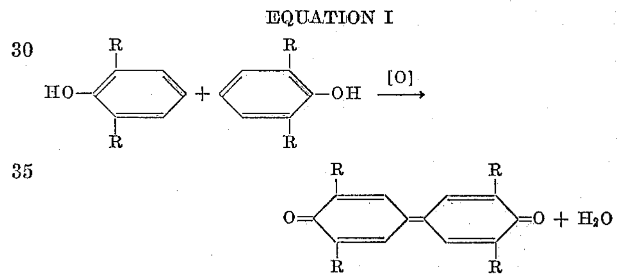

where R is as previously defined.

It is to be understood that the reaction is not a direct oxidation as illustrated, but an oxidation involving participation of the copper catalyst system as an oxygen-carrying intermediate.

The general method of carrying out my oxidation process is to pass an oxygen-containing gas through a solution of one or more 2,6-disubstituted monohydric, monocyclic phenols as starting materials, said solution also containing dissolved therein a complex of a basic cupric salt and the nitrile or amide.

In my copending application, Serial No. 212,128, filed July 24, 1962, which is a continuation-in-part of my application Serial No. 69,245, filed November 15, 1960, now abandoned, which is a continuation-in-part of my application, Serial No. 744,086, filed June 24, 1958, now abandoned, and in my copending application, Serial No. 212,127, filed July 24, 1962, all of which are assigned to the same assignee as the present invention, I have disclosed a method of oxidizing phenols to either polymeric phenylene ethers or to diphenoquinones by the use of a dissolved oxygen-carrying intermediate comprising an amine-basic cupric salt complex. Polyphenylene ethers (phenylene ether or phenylene oxide polymers) usually are obtained providing the phenol is not substituted in the 2- and 6-positions with large bulky groups, such as tertiary butyl groups, in which case, diphenoquinones are obtained. Diphenoquinone formation, by those phenols which normally produce polyphenylene ethers, is favored by an increase in reaction temperature, preferably where the water is removed as fast as it is formed. Under some conditions both diphenoquinones and polyphenylene ethers are formed. In the present invention, by the use of a complex of a basic cupric salt and an organic nitrogen-containing compound selected from the class consisting of cyano-substituted hydrocarbons and tertiary carbamoyl-substituted hydrocarbons, i.e., N,N-di(monovalent hydrocarbon)carbamoyl-substituted hydrocarbons or carbamoyl-substituted hydrocarbons having two monovalent hydrocarbon radicals directly bonded to the nitrogen of the carbamoyl group, high yields of the corresponding diphenoquinone are formed with only trace amounts of the phenylene ether polymers regardless of whether the water is or is not removed as fast as formed during the oxidation reaction and regardless of whether the substituents are or are not large bulky groups.

2,6-disubstituted phenols which can be oxidized by my process are represented by the following formula

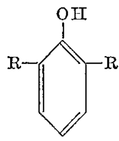

where R is a monovalent substituent selected from the group consisting of alkyl, alkoxy, aryl and aryloxy radicals, examples of which are: methyl, ethyl, propyl, butyl, amyl, hexadecyl, octadecyl, cyclohexyl, cyclopropyl, methoxy, ethoxy, butoxy, dodecyloxy, benzyl, phenylethyl, naphthylpropyl, tolylbutyl, phenyl, tolyl, xylyl, naphthyl, benzyloxy, phenyloxy, tolyloxy, etc.

Examples of 2,6-disubstituted phenols which may be used in practicing my invention are: 2,6-dimethylphenol, 2,6-diethylphenol, 2-methyl-6-ethylphenol, the 2,6-dibutylphenols, 2,6-ditetradecylphenol, the 2,6-dipropylphenols, 2,6-diphenylphenol, 2,6-dimethoxyphenol, 2,6-diethoxyphenol, 2-methoxy-6-ethoxyphenol, 2-methyl-6-methoxyphenol, 2-ethyl-6-hexadecyloxyphenol, the 2,6-diphenoxyphenols, 2-methyl-6-isobutylphenol, 2-methyl-6-phenylphenol, 2,6-dibenzylphenol, the 2,6-diphenylethylphenols, 2,6-ditolylphenol, 2,6-dipropylphenol, 2,6-bis-(2',4'-dichlorophenyl)phenol, 2,6-dicyclohexylphenol, etc.

In providing the catalyst comprising a complex of a basic cupric salt and the nitrile or amide, the particular copper salt used has no effect on the type of product obtained. I may start with either a cuprous or a cupric salt. The only requirement is that, if a cuprous salt is used, it must be capable of existing in the cupric state and must form a complex with the nitrile or amide that is soluble in the reaction medium.

The necessity for being able to exist in the cupric state is based on my belief that the oxidation of the phenol is accomplished by the oxygen reacting with the nitrile-cuprous salt or amide-cuprous salt complex to form an intermediate activated nitrile-basic cupric salt or amide-basic cupric salt complex that reacts with the phenol to form an unstable intermediate which decomposes forming the diphenoquinone and water as the products and regenerates the amide-cuprous salt or nitrile-cuprous salt complex.

This activated complex can also be formed by starting originally with a cupric salt in making the copper-nitrile or copper-amide complex, for example, by using a reducing agent which unites with the liberated anion and forms the cuprous salt in situ, e.g., copper metal. However, more simple methods may be used, for example, the activated complex may be formed by adding cupric hydroxide to a cupric salt, adding a base to a cupric salt, by treating a cupric salt with an ion-exchange resin having exchangeable hydroxyl groups, etc. Preferably, these reactions are carried out in the presence of the nitrile or amide to prevent precipitation of the basic cupric salt, but it is possible to add the nitrile or amide later to dissolve the basic cupric salt even as a precipitate. As will be explained in more detail later, the amount of hydroxyl ion introduced into the complex should not be sufficient to convert the cupric salt to cupric hydroxide unless additional cupric salt is added later.

Typical examples of the copper salts suitable for my process are cuprous chloride, cupric chloride, cuprous bromide, cupric bromide, cuprous sulfate, cupric sulfate, cuprous azide, cupric azide, cuprous tetraamine sulfate, cupric tetraamine sulfate, cuprous acetate, cupric acetate, cuprous propionate, cupric butyrate, cuprous palmitate, cupric laurate, cuprous benzoate, cupric toluate, etc. Cuprous chloride, cupric chloride, cuprous bromide, cupric bromide, cuprous azide, and cupric azide, produce the most active catalysts. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc., are not suitable for use in my process, since they are either not soluble in the nitrile or amides or are not capable of existing as stable cupric salts. For example, cupric cyanide and cupric thiocyanate autogeneously decompose to the corresponding cuprous salt. Cuprous nitrate and cuprous fluoride are not known to exist but the nitrile or amide complexes can be made in situ. Substitution of cupric chloride, cupric sulfate, cupric perchlorate and cupric nitrate for the cuprous salt, without first converting them to the corresponding basic cupric salt, gave no oxidation of the 2,6-disubstituted phenols.

Examples of nitriles or cyano-substituted hydrocarbons which may be used in practicing my invention are those corresponding to the formula $R'(CN)_x$ where R' is a hydrocarbon radical, e.g., alkyl (including aralkyl, cycloalkyl), alkylene, alkenyl, alkynyl, aryl (including alkaryl), arylene, etc., and $x$ is an integer and is at least one up to the total number of replaceable hydrogens on R'. Preferably, R' is alkyl or aryl and $x$ is 1 to 2. Specific examples are: the aliphatic nitriles, for example, acetonitrile, acrylonitrile, propionitrile, butyronitrile, valeronitrile, capronitrile, stearonitrile, including those containing two or more nitrile groups, for example, malononitrile, succinonitrile, maleonitrile, adiponitrile, itaconitrile, citronitrile, etc., and the arylnitriles, for example, benzonitrile, tolunitrile, naphthonitrile, etc., including those arylnitriles and amides having two or more nitrile groups substituted thereon, for example, phthalonitrile, isophthalonitrile, N,N-dimethyl-p-cyanobenzamide, trimellitonitrile, trimesonitrile, etc. Also included in the aliphatic series are those cycloaliphatic nitriles, for example, cyclohexanonitrile, cycloheptanonitrile, etc., as well as those aryl-substituted aliphatic nitriles, for example, phenylacetonitrile, naphthylacetonitrile, etc.

Examples of the tertiary amides or tertiary carbamoyl substituted hydrocarbons which may be used in practicing my invention are those corresponding to the general formula

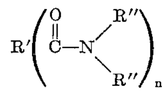

where R' and $n$ are as defined above for the nitriles, and each R'' is the same or different monovalent hydrocarbon radical, e.g., alkyl, alkenyl, alkynyl, aryl, etc. Preferably, R' is alkyl or aryl and R'' is alkyl. Specific examples are: N,N-dimethylacetamide, N,N-diethylacetamide, N,N-dimethylbenzamide, N,N-dimethylcyclohexanamide, N-methyl-N-ethylacetamide, N,N-dimethylbutyramide, N-N-diethylpropionamide, N,N-hexylacrylamide, N,N-dipropylmaleamide, N-phenyl-N-cyclohexylvaleramide, N,N-dimethylisophthalamide, N,N-dimethylnaphthamide, N,N,N',N'-dimethylisophthalamide, etc.

Although I do not want to be bound by my theory, I believe that the copper salt forms a complex with the nitrogen in the amide or nitrile. Because, generally, amides and nitriles are more weakly basic than amines, they do not form as strong complexes as amines. To overcome this, larger amounts of nitriles or amides are required. The amount required is dependent not only on the particular amide or nitrile but also on the reaction medium. Sufficient amide or nitrile should be used that the complex it forms with the copper salt is soluble in the reaction medium. Larger quantities of the nitrile or amide can be used even up to the quantity that it becomes the sole solvent for the phenol and copper salt. The exact structure of the complex and the structure of the intermediate formed with the phenols are unknown at the present time. However, it is known that the soluble complex formed from a cuprous salt and the nitrile or amide can react with oxygen to form an oxidized intermediate while the soluble complex formed from a cupric salt is already in the form of the oxidized intermediae which in some manner can form a complex with the phenol. This latter complex activates the aryl nucleus in some way so that diphenoquinones are formed with the regeneration of a catalyst in the reduced or cuprous state which can react with additional oxygen to form the active oxidized intermediate. This is based on the fact that if I pass oxygen into my catalyst system prepared from a cuprous salt until it is saturated, or treat one equivalent of a cupric salt complex with one equivalent of a base and then add the phenol with no further addition of oxygen, one mole of phenol is oxidized for two moles of copper present in the catalyst. By such a reaction I can cause a self-condensation of the phenols without actually passing oxygen into the reaction system containing the phenol.

It is desirable when starting with a cupric salt to add one equivalent of base for each mole of copper salt to most effectively use all of the copper. If less base is used, then only the equivalent amount of copper salt is converted to the catalytically active nitrile or amide-basic cupric salt complex leaving the balance of the cupric salt unchanged which even in the form of its nitrile or amide complex is an inactive ingredient in the system. Likewise, if more than one equivalent of base is added, then some or all of the cupric salt is converted into cupric hydroxide which likewise is an inactive ingredient even in the form of its nitrile or amide complex. In effect, the addition of more or less than one equivalent of base, i.e., one mole of hydroxyl ion to a mole of a cupric salt results in the same effect as though less of the cupric salt had been used to form the nitrile or amide-basic cupric salt complex. This same effect is noted if more than one equivalent acid, i.e. one mole of hydrogen ions or one mole of a cupric salt is added to one mole of cupric hydroxide in forming the complex.

The cupric salts of carboxylic acids, for example, cupric acetate, cupric benzoate, etc., represent a unique class of cupric salts. They will form a complex with nitriles and tertiary amides which in the presence of oxygen will produce diphenoquinones, but the reaction is slower than if the cupric carboxylate had been converted to the corresponding nitrile or amide-basic cupric carboxylate complex. Evidently, because of the weakly acidic nature of carboxylic acids, the phenol and the cupric carboxylate complex are in equilibrium with the phenol-basic cupric salt amide or nitrile and the carboxylic acid. Apparently the equilibrium mixture is predominantly in the form of the cupric salt complex and phenol, since the slow reaction indicates a low concentration of the active catalyst species.

The phenol-basic cupric salt amide or nitrile complex is the same as would be obtained from nitrile or amide and a cuprous salt and oxygen or a cupric salt and a base when reacted with a phenol in a non-equilibrium reaction. In the specification and claims, I use the term "complex of a basic cupric salt and an organic nitrogen-containing compound selected from the group consisting of nitriles and tertiary amides" and the term "complex of a basic cupric salt and an organic nitrogen-containing compound selected from the group consisting of cyano-substituted hydrocarbons and N,N-di(monovalent hydrocarbon) carbamoyl-substituted hydrocarbons" to denote the catalytically active complex described above which acts or is used as the oxygen-carrying intermediate in the oxidation of the 2,6-disubstituted phenols to diphenoquinones. This complex can be obtained from either cuprous or cupric salts and oxidizes the phenols to diphenoquinones while the copper in the complex is reduced to the cuprous state.

If the quantity of phenol to be reacted is greater than can be oxidized by the amount of complex present, oxygen is introduced into the reaction mixture to reoxidize the cuprous complex back to the basic cupric complex. Whether this is done or whether the stoichiometric amount of the nitrile or amide-basic cupric salt complex is used to oxidize the phenol, the net overall reaction in either case is the reaction of oxygen, either elemental or from the complex, with the phenol. This reaction, therefore, may best be described as the reaction of 2,6-disubstituted phenols with oxygen using the nitrile or amide-basic cupric complex as the oxygen-carrying intermediate.

Although mixtures of amides, mixtures of nitriles, mixtures of amides and nitriles, or a cyano-substituted amide and mixtures of cuprous salts may be used in forming my catalyst system, no benefit would accrue from such use. Preferably, the cuprous salt is dissolved in the nitrile or amide before the 2,6-disubstituted phenol reactant is added. In some cases the dissolving of the cuprous salt may be hastened by heating the mixture by bubbling in air or oxygen or a combination thereof, but in some cases a completely homogeneous solution is not obtained until the phenol reactant is added. In order to effectively use all of the copper, enough amide or nitrile should be added to complex and thereby dissolve all of the added cuprous salt. Larger excesses do not adversely affect the reaction and in some cases, where the amide or nitrile is a liquid at the reaction temperature, it may be desirable to use an excess in order to completely dissolve all of the 2,6-disubstituted phenol reactant and to act as a solvent for the reaction. The concentration of the catalyst in the reaction mixture is not critical, it being only necessary to use an effective concentration that can be readily determined by persons skilled in the art from the above description and from the examples which follow.

In addition to the amides or nitriles which may be used as solvents, other solvents such as alcohols, ketones, hydrocarbons, chlorohydrocarbons, nitrocarbons, ethers, esters, amides, mixed ether esters, sulfoxides, etc., may be present in the reaction system providing they do not interfere or enter into the oxidation reaction. Typical examples of such solvents which may be used are ethanol, methanol, isopropanol, acetone, anisole, benzene toluene, trichloroethylene, dichlorobenzene, nitrobenzene, ethylactate, N,N-dimethylacetamide, dimethylsulfoxide, etc. The amount of solvent can be varied widely, if only being necessary to provide enough solvent to form a homogeneous solution of the catalyst and phenol reactant from which the desired diphenoquinone precipitates as it is formed.

An oxygen-containing gas, which may be oxygen itself, is bubbled into the reaction mixture causing an exothermic reaction to take place with the formation of water as a by-product. If it is desired, this water may be permitted to distill from the reactive mixture by sweeping with an inert gas, by carrying out the reaction of subatmospheric pressure, by azeotropic distillation, by the use of open reaction vessels, by heat or any combination thereof. In carrying out my reaction, the oxygen may be diluted with an inert gas such as nitrogen, helium, argon, etc., or air can be used. By controlling the ratio of oxygen to inert gas and the inlet temperature of this mixture, I can conveniently sweep the reaction mixture to cause removal of all the water as it is formed.

Since the reaction is usually exothermic, the reaction can become overheated, resulting in the formation of undesirable products. Generally, I initiate the oxidation reaction at as low a temperature as the reaction will start, as evidenced by the reaction becoming exothermic. Usually, I control my oxidation reaction so that the maximum temperature does not exceed substantially 110° C. The heat of reaction may be removed, for example, by radiation, convection, or by cooling coils which can be either immersed in or surround the reaction vessel. The water of reaction may also be permitted to distill from the reaction to attain both water removal and heat control.

Ordinarily, I continue the passage of the oxygen-containing gas into the reaction mixture until no more heat is generated or the desired amount of oxygen is absorbed. Alternatively, I may intermittently or continuously add the same or a different 2,6-disubstituted phenol from the starting material during the oxidation reaction to produce mixed diphenoquinones.

To terminate the reaction, I destroy the catalyst system by the addition of an acid, preferably a mineral acid, such as hydrochloric acid or sulfuric acid, which reacts with the amide, nitrile or cuprous salt. However, since the diphenoquinone precipitates from the reaction mixture, I may conveniently remove the product from the reaction mixture by various means, for example by filtration, centrifugation, etc., and reuse the mother liquor for oxidizing another batch of 2,6-disubstituted phenols to diphenoquinones. The recovered diphenoquinone is washed free of mother liquor by usually washing with a low-boiling solvent which is a non-solvent for the diphenoquinone, but a solvent for the other components of the reaction mixture.

In order that those skilled in the art may better understand how my invention may be practiced, the following examples are given by way of illustration and not by way of limitation. In the examples, all parts are by weight, unless stated otherwise.

*Example 1*

Oxygen was passed through a vigorously stirred mixture of 125 ml. of acetonitrile and 2 grams of cuprous chloride in a 250 ml. flask, immersed in a 30° C. water bath. When the copper salt had dissolved, 5 grams (0.41 mole) of 2,6-dimethylphenol was added. At the end of 30 minutes' reaction time, a red precipitate was removed by filtration, and the filtrate was oxidized for an additional 30 minutes, to produce a second batch of red precipitate. The total yield was 4.6 grams (0.019 mole) or 93% yield, which was identified as 3,3',5,5'-tetramethyldiphenoquinone having a melting point of 224° C.

When this example was repeated using 2-methyl-6-t-butylphenol, the product was identified as 3,3'-dimethyl-5,5'-t-butyldiphenoquinone and was obtained as red colored crystals having a melting point of 217° C. With 2,6-di-t-butylphenol, the product was identified as 3,3',5,5'-tetra-t-butyldiphenoquinone and was obtained as red colored crystals having a melting point of 246° C. Using 2,6-diisopropylphenol, the product was identified as 3,3',5,5'-tetraisopropyldiphenoquinone and was obtained as red colored crystals having a melting point of 225° C.

When 3.4 grams of cupric chloride dihydrate is substituted for the 2 grams of cuprous chloride in the above reaction mixture, no reaction occurs when oxygen is passed into the solution containing the 2,6-dimethylphenol. However, when 1.12 grams of potassium hydroxide is added to the solution, the reaction proceeds in the same manner to produce the same product as when cuprous chloride was used, thus showing that cupric chloride itself is not capable of forming the active catalyst but that the basic cupric chloride functions in the same way as the catalyst prepared from the cuprous chloride.

*Example 2*

Oxygen was passed through a vigorously stirred solution of 135 ml. of benzonitrile and 2 grams of cuprous chloride in a 250 ml. flask heated on a steam bath. After the cuprous chloride was all dissolved, 10 grams (0.082 mole) of 2,6-dimethylphenol was added. At the end of 50 minutes, a copious red precipitate was separated by filtration and dried yielding 8.2 grams (0.034 mole, 83% yield) which was identified as 3,3',5,5'-tetramethyldiphenoquinone having a melting point of 224° C.

*Example 3*

Oxygen was passed through a vigorously stirred solution of 135 ml. of N,N-dimethylacetamide and 1 gram of cuprous chloride contained in a 250 ml. Erlenmeyer flask heated on a steam bath. After the cuprous chloride had dissolved, 10 grams (0.082 mole) of 2,6-dimethylphenol was added. At the end of 40 minutes' reaction time, there was a copious red precipitate. After cooling to 25° C., the solvent was removed by filtration, washed with alcohol, and dried, yielding 7.8 grams (0.033 mole, 79% of theory) of a compound which was identified as 3,3',5,5'-tetramethyldiphenoquinone having a melting point of 224° C.

*Example 4*

Oxygen was bubbled through a vigorously stirred solution of 2 grams of cuprous chloride, 125 ml. of acrylonitrile and 10 grams of 2,6-dimethylphenol for 3 hours. The reaction mixture was filtered to isolate the product, identified as 3,3',5,5'-tetramethyldiphenoquinone having a melting point of 224° C.

*Example 5*

Oxygen was passed through a vigorously stirred solution of 1 gram of cuprous chloride, 30 ml. of N,N-dimethylacetamide, 100 ml. of n-decane and 5 grams of 2-ethyl-6-methylphenol heated on a steam bath for 20 minutes. The reaction mixture was cooled and filtered to isolate the product which was identified as 3,3'-diethyl-5,5'-dimethyldiphenoquinone having a melting point of 140° C.

*Example 6*

Oxygen was passed through a vigorously stirred solution of 1 gram of cuprous chloride, 135 ml. of N,N-dimethylacetamide and 10 grams of 2-methyl-6-t-butylphenol heated on a steam bath for 90 minutes. The reaction mixture was cooled and filtered to isolate the red insoluble product identified as 3,3'-dimethyl-5,5'-di-t-butylphenoquinone having a melting point of 217° C.

It will of course be apparent to those skilled in the art that in addition to the 2,6-disubstituted phenols employed in the foregoing examples, other 2,6-disubstituted phenols in which the alkyl or aryl groups vary may be employed without departing from the scope of the invention. Obviously, other nitriles and amides and copper salts may be employed in place of those used in the foregoing examples, so that one of the proportions of the copper salt and the amide or nitrile can be varied consistent with there being present sufficient amounts for each complexing purpose. In addition, the conditions under which the oxidation reaction takes place may be varied within wide limits and advantageously within those limits described previously.

The compositions obtained in accordance with the practice of the present invention have many uses. Thus, the diphenoquinones obtained can be employed as oxidation inhibitators, for various resins including vinyl halide resins, butadiene polymers, etc. Furthermore, the diphenoquinone compositions can be readily reduced with hydrogen, for example, with zinc metal and a mineral acid such as hydrochloric acid, or as shown, for instance, in Canadian Patent 392,259, to diphenohydroquinones of the formula

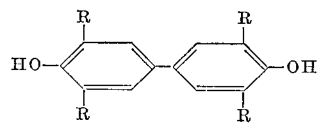

where R is as previously described. Such compositions can be reacted with dicarboxylic acids, for instance, isophthalic acid, terephthalic acid, or the corresponding acid chloride, esters or anhydrides, to make aromatic polyesters having good heat stability despite the fact that these compositions are thermoplastic. Likewise, these diphenohydroquinones may be reacted with phosgene alone or in conjunction with acid halides such as those disclosed above, to make aromatic polycarbonates also having good stability even though thermoplastic.

What I claim as new and desire to secure by Letters Patent of the United States is:

1. The process of preparing 3,3',5,5'-tetra-substituted diphenoquinone which comprises reacting oxygen with a 2,6-disubstituted phenol, said substituents on the phenol and the diphenoquinone being monovalent radicals selected from the group consisting of alkyl, alkoxy, aryl and aryloxy radicals, said reaction being carried out in a solution of a complex of a basic cupric salt and an organic nitrogen-containing compound selected from the group consisting of cyano-substituted hydrocarbons and N,N-di-(monovalent hydrocarbon)carbamoyl substituted hydrocarbons in which said phenol is soluble.

2. The process of claim 1 wherein the organic nitrogen-containing compound is a cyano-substituted hydrocarbon.

3. The process of claim 1 wherein the organic nitrogen-containing compound is an N,N-di-(monovalent hydrocarbon)carbamoyl substituted hydrocarbon.

4. The process of claim 1 wherein the substituents on the phenol and the diphenoquinone are alkyl radicals.

5. The process of preparing 3,3',5,5'-tetramethyldiphenoquinone which comprises reacting oxygen with 2,6-dimethylphenol, said reaction being carried out in a solution of a complex of a basic cupric salt and an organic nitrogen-containing compound selected from the group consisting of cyano-substituted hydrocarbons and N,N-di-(monovalent hydrocarbon)carbamoyl substituted hydrocarbons in which said phenol is soluble.

6. The process of making 3,3'-dimethyl-5,5'-di-t-butyldiphenoquinone which comprises reacting oxygen with 2-methyl-6-t-butylphenol, said reaction being carried out in a solution of a basic cupric salt and an organic nitrogen-containing compound selected from the group consisting of cyano-substituted hydrocarbons and N,N-di-(monovalent hydrocarbon)carbamoyl substituted hydrocarbons in which said phenol is soluble.

7. The process of preparing 3,3',5,5'-tetra-t-butyldiphenoquinone which comprises reacting oxygen with 2,6-di-t-butylphenol, said reaction being carried out in a solution of a complex of a basic cupric salt and an organic nitrogen-containing compound selected from the group consisting of cyano-substituted hydrocarbons and N,N-di-(monovalent hydrocarbon)carbamoyl substituted hydrocarbons in which said phenol is soluble.

8. The process of preparing 3,3',5,5'-tetraisopropyldiphenoquinone which comprises reacting oxygen with 2,6-diisopropylphenol, said reaction being carried out in a solution of a complex of a basic cupric salt and an organic nitrogen-containing compound selected from the group consisting of cyano-substituted hydrocarbons and N,N-di-(monovalent hydrocarbon)carbamoyl-substituted hydrocarbons in which said phenol is soluble.

9. The process of preparing 3,3'-diethyl-5,5'-dimethyldiphenoquinone which comprises reacting oxygen with 2-ethyl-6-methylphenol, said reaction being carried out in a solution of a complex of a basic cupric salt and an organic nitrogen-containing compound selected from the group consisting of cyano-substituted hydrocarbons and N,N-di-(monovalent hydrocarbon)carbamoyl-substituted hydrocarbons in which said phenol is soluble.

References Cited by the Examiner

UNITED STATES PATENTS 2,785,188 3/57 Coe ---------------- 260—396
2,905,674 9/59 Filbey -------------- 260—396

OTHER REFERENCES

Kharasch et al.: J. Org. Chem., vol. 22, pp. 1439–43 (1957).

LORRAINE A. WEINBERGER, *Primary Examiner.*